United States Patent
Tarfaoui

(10) Patent No.: US 11,088,401 B1
(45) Date of Patent: Aug. 10, 2021

(54) TUBULAR BATTERY PACK AND INTEGRAL TUBULAR BATTERY WITH THERMAL MANAGEMENT AND SAFETY RELIEF SYSTEM

(71) Applicant: Ahmed Tarfaoui, Houston, TX (US)

(72) Inventor: Ahmed Tarfaoui, Houston, TX (US)

( * ) Notice: Subject to any disclaimer, the term of this patent is extended or adjusted under 35 U.S.C. 154(b) by 0 days.

(21) Appl. No.: 17/176,070

(22) Filed: Feb. 15, 2021

(51) Int. Cl.
| | |
|---|---|
| *H01M 10/42* | (2006.01) |
| *B60L 58/26* | (2019.01) |
| *B60L 58/27* | (2019.01) |
| *H01M 10/04* | (2006.01) |
| *H01M 10/613* | (2014.01) |
| *H01M 10/653* | (2014.01) |
| *H01M 10/6556* | (2014.01) |
| *H01M 10/0525* | (2010.01) |
| *H01M 10/643* | (2014.01) |

(52) U.S. Cl.
CPC ......... *H01M 10/425* (2013.01); *B60L 58/26* (2019.02); *B60L 58/27* (2019.02); *H01M 10/0422* (2013.01); *H01M 10/0525* (2013.01); *H01M 10/613* (2015.04); *H01M 10/643* (2015.04); *H01M 10/653* (2015.04); *H01M 10/6556* (2015.04); *H01M 2010/4271* (2013.01); *H01M 2220/20* (2013.01)

(58) Field of Classification Search
CPC ............ H01M 10/425; H01M 10/643; H01M 10/0525; H01M 10/0422; H01M 10/653; H01M 10/6556; H01M 10/613; H01M 2010/4271; H01M 2220/20; B60L 58/26; B60L 58/27
USPC ........................................................ 429/120
See application file for complete search history.

(56) References Cited

U.S. PATENT DOCUMENTS

| | | | |
|---|---|---|---|
| 2016/0233564 A1* | 8/2016 | Rinker .................... | B60L 58/26 |
| 2020/0220240 A1* | 7/2020 | Cheng ................. | H01M 10/658 |

* cited by examiner

*Primary Examiner* — Gary D Harris

(57) ABSTRACT

The present invention is focused on the making of tubular battery pack and integral tubular battery characterised by the use of high energy density lithium-ion cells mounted in thin tubes in shell and tube heat exchanger configuration for thermal management. Each lithium-ion cell is mounted inside the tube and electrically insulated from its wall using external thin washers or internal isolating plate. The remainder of the cell surface is exposed and transfer heat to the inner wall of the tube. A thermal medium is circulated in and out of the shell and over the outer surface of the tubes to maintain them at an optimum temperature range of 0° C. to 50° C. The tube bundle has an integral battery management system a safety relief system. Each tube and shell assembly, is one module within the battery. Multiple modules are connected to form the final battery.

14 Claims, 6 Drawing Sheets

TUBULAR BATTERY PACK AND INTEGRAL TUBULAR BATTERY WITH THERMAL MANAGEMENT AND SAFETY RELIEF SYSTEM

BACKGROUND OF THE INVENTION

1. Field of the Invention

The present invention relates to the making of tubular battery pack and integral tubular battery for electric vehicles and machinery characterised by the use of high energy density lithium-ion cells, mounted inside thin tubes in efficient tube and shell heat exchanger configuration for thermal management. The battery consists of one or multiple modules. Each module has one bundle of tubes mounted to a rectangular or cylindrical shell. Each tube holds one lithium-ion cell mounted inside the tube and electrically insulated from the tube wall using thin washers. The remainder of the cell's exterior surface is exposed and radiate heat to the inner wall of the tube. A cooling or heating medium is circulated in and out of the shell and over the outer surface of the tubes to maintain them at an optimum temperature range of 0° C. to 50° C. The shell and tube configuration battery has an battery management system, temperature control and a safety relief system.

2. Description of the Related Art

Batteries for electric vehicles are made by the packing of rechargeable lithium-ion cells of the 18650 type or other newly developed cells. Hundreds of lithium-ion cells are packed in a single module, and multiple modules are connected to each other to form the full battery pack comprising thousands of cells. The high number of cells requires an efficient cooling system to prevent the batteries from heating during operation and recharging. Similarly, when the temperature of the surrounding is below 0° C., a heating system is required. It is desirable that the thermal fluid reaches each individual cell proximity and provides a uniform temperature throughout the cells so to avoid hot spots and damage of the cells. The cells must be insulated from the thermal fluid to prevent loss of electric power to the surrounding and to protect against fire and corrosion and to provide for safe operation and durability of the battery pack.

The cells are often glued together using a low conductive polymer which makes replacement of individual batteries as well as modules repair very difficult to achieve.

When a single cell or multiple cells burst, gases are released which require a safety relief system to collect these gases and vent them safely.

U.S. Pat. No. 10,886,512 B2 to Bourke et al. (issued Jan. 5, 2021) gives an example of newly design battery pack with a thermal management system. All cells are mounted in parallel and the vicinity of each cell is reached by vertical fin like connectors that are part of a horizontal base plate. The mode of operation of the battery and weather conditions determines whether the plate is heated or cooled through fluid circulation. All cells have open paths to each other and any released gases can affect the entire module and battery pack without a venting system. The presence of hot spots is likely because the fluid circulates only through the base plate and relies on the fins or stagnant fluid film to conduct heat further away from the cells to the base plate. Heating the module during winter can be a challenge because of lack of insulation and loss of heat to the surrounding since all cells are open to each other.

U.S. patent Ser. No. 10/340,565 B2 to Kim et al. (issued Jul. 2, 2019) claims that a tube through which fluid flows, is mounted on the perimeter of a plate like fin, and in turn the fin is in contact of a battery of rectangular shape referred to as a battery cell. The larger the battery, the less efficient the heat removal, and the smaller the battery the less the energy density obtained because of the space taken by the dimensions of the tube, the fin and the frame.

U.S. Pat. No. 10,897,067 B2 to Sekiya et al. (issued Jan. 19, 2021) claims that a cooling water pipe mounted on the perimeter of a heat transfer sheet, and in turn the sheet is fixed to the lower surface of the battery module of rectangular shape. This system is similar to U.S. patent Ser. No. 10/340,565 B2 to Kim et al.

U.S. Pat. No. 10,886,580 B2 to Butterfield et. al. (issued Jan. 5, 2021) claims that each cylindrical battery cell is attached to a cooling plate which in turn may comprise channels of cooling fluid. This system is similar to U.S. patent Ser. No. 10/340,565 B2 to Kim et al. and U.S. Pat. No. 10,897,067 B2 to Sekiya et al. None of which provide any safety relief protection from potential gas release during failure of any cell. Maintenance or repairs are extremely difficult and are not considered in the design. Heat exchange is also not efficient and hotspots are likely to occur.

U.S. Pat. No. 10,868,347 B2 to Pucher (issued Dec. 15, 2020) claims that a cooling plate which in turn may comprise one or more cooling tubes molded within. This system is similar to U.S. patent Ser. No. 10/340,565 B2 to Kim et al. and U.S. Pat. No. 10,897,067 B2 to Sekiya et al.

U.S. Pat. No. 9,419,316 B2 to Meyer et al. (issued Aug. 16, 2016) claims a serpentine fluid circulating tube around part of the periphery of a plurality of electric cells. The cells are connected to interleaved fins which in turn are connected to the circulating tube. This limits the number of cells and reduces the energy density considerably. Heat exchange is also not efficient and hotspots are likely to occur.

The primary focus of the above inventions is on energy density of the battery pack and not on durability through efficient heat removal, nor on safety through the venting of potential harmful gases that can be released. Maintenance and recycle of battery packs is not considered in their design.

SUMMARY OF THE INVENTION

The invention as claimed provides a novel tubular battery pack and integral tubular battery for electric vehicles, and machinery as well as the storage and transport of large quantities of electric energy. The invention uses thin tubes in which lithium-ion cells are packed and insulated from the walls of the tubes using thin washers. The remainder of cell's surface is exposed and exchanges heat by convection and radiation with the inner wall of the tube. The tubes are mounted to tube-sheets which in turn are mounted to a rectangular or cylindrical shell. Thermal fluid flows through the shell interior and around the exterior of the tubes. Each shell and tube configuration constitute a module. Each module has its own module battery management system (BMS). Modules are electrically connected to each other in either parallel or serial manner.

Each tube in the invention as claimed is open to a closed chamber situated between the tube-sheet and the cover where potential build up gases in the tubes are released to a safety vent system. These gases can be generated from the defect of lithium-ion cells inside the tubes. Each of these chambers within each module is connected to a safety relief device and all safety devices are connected to an exhaust header.

All parts can be made out of plastic and composite material with exception of the tubes and tube-sheets that are made out of stainless steel for corrosion protection and efficient exchange of heat with the fluid medium.

Each cell in a tube can be easily replaced as the Modules are mounted on the chassis of the vehicle and made easily accessible. This method of construction is compact since the distance between two adjacent tube does not need to be more than ¼ of inch for optimum heat transfer to occur.

There is always a trade off between energy density and heat removal for safe recharge of lithium-ion cells. This invention provides a system that is safe and most efficient in heat exchange because of the belief that technology of batteries will improve and batteries will become more energy dense and resilient and the demand for more efficient systems of heat exchange is likely to increase. Also, these tubular batteries may find applications in larger vehicles such as buses and inner city driving where more heat will be generated due to frequent acceleration and deceleration.

BRIEF DESCRIPTION OF THE INVENTION

The present invention relates to the making of tubular battery pack and integral tubular battery for electric vehicles and machinery characterised by the use of high energy density Lithium-ion cells and efficient tube and shell heat exchanger configuration for thermal management. The battery consists of one or multiple modules. Each module has two fixed tube-sheets holding multiple tubes and mounted to a rectangular or cylindrical shell. Each tube holds one lithium-Ion cell mounted inside the tube and electrically insulated from the tube wall using thin washers. The remainder of cell surface is exposed and transfer heat by both convection and radiation to the inner wall of the tube. A cooling or heating medium is circulated in and out of the shell and over the outer surface of the tubes to maintain them at an optimum temperature range of 0° C. to 50° C. The tube bundle has two electrodes connected to an integral battery management system.

Each Tube is open to a closed chamber situated between the tube-sheet and the cover where potential build up gases in the tubes are released to a safety vent system. These gases can be generated from the defect of lithium-ion cells inside the tubes. Each of these chambers within each module is connected to a safety relief device and all safety devices are connected to an exhaust header.

FIG. 1 is an illustration of a tubular battery pack 100. Lithium-ion cell 200, of 18 mm in diameter is mounted in 1-inch nominal diameter tube 101, or a cell of 46 mm in diameter or the equivalent is mounted on a 2-inches nominal diameter tube 101. The cells are insulated from the inner walls of the tube using washers 201 so to prevent electric conductivity to the tube and allow heat to flow by radiation and convection in accordance with an embodiment of this invention.

The tubes 101, attached from both ends to two fixed tube-sheets 102, are open to a closed chamber 104 and release any gases that are generated from the cells through safety vent 1041 in accordance with an embodiment of this invention.

The tube-sheets 102 are fixed to shell 103. Thermal fluid is circulated in and out of the shell 103 through nozzles 1031 and 1032 and heat is exchanged between the tubes' outer walls and the fluid in accordance with an embodiment of this invention The tube-sheets 102 also serve as flanges for the attachment of the closure 104 and covers 105.

Battery cells 200 with attached washers 201, are placed and centered inside each tube. The washers 201, insure a void 202 between the cell wall and the inner tube wall. The majority of the cell wall is exposed and releases heat to the tube by convection and radiation. Anode 203 and cathode 204 are enclosed within their insulated plates and seal the modular battery pack from both ends. The anode and cathode are connected to a battery management system (BMS) 205 for safety of cells during usage and recharge.

The cells can also be made as integral part of the tubes. In this case, the tube and shell assembly constitute an integral tubular battery. The integral tubular battery electrodes have connections to the tube ends but not the tube' walls. and only heat is conducted through the tube walls to the thermal fluid circulating in and out of the shell, in accordance with an embodiment of this invention.

FIG. 2 is an illustration of an integral tubular battery 100 with a close-up on the cell 200 in shell and tube configuration cross section. The tubes 101, attached from both ends to two fixed tube-sheets 102, as described above. The cell 200 is a typical cylinder lithium-ion cell with rolled electrode assembly 230 such as in the 18650 type. The main improvement is that the bottom plate 212 is attached to the cell's anode and insulated from the cylindrical wall 210 using internal insulating plate 211. Also, an insulating O-ring 221 is added under the insulating plate 220 and assure that the cell remains leak tight. This modification insulates the lithium-ion cell cylindrical wall 210 and allows for direct contact with the metal fitting 106 and tube wall 101 for the conduction of heat but not electricity in accordance with an embodiment of this invention.

FIG. 3A and FIG. 3B show a circular and rectangular tube sheet 102. The number of tubes is optimized so the distance between any adjacent holes is ¼ inch. The diameter added to the distance in between two adjacent holes is referred to as the pitch 1021. The tube holes are arranged in a triangular pitch 1022 or rotated square pitch 1023 relative to the direction of flow of the thermal medium as shown by the arrows in both FIGS. 3A and 3B. The triangular and rotated square pitch are the preferred tube configuration in accordance with an embodiment of this invention.

Figure 6:
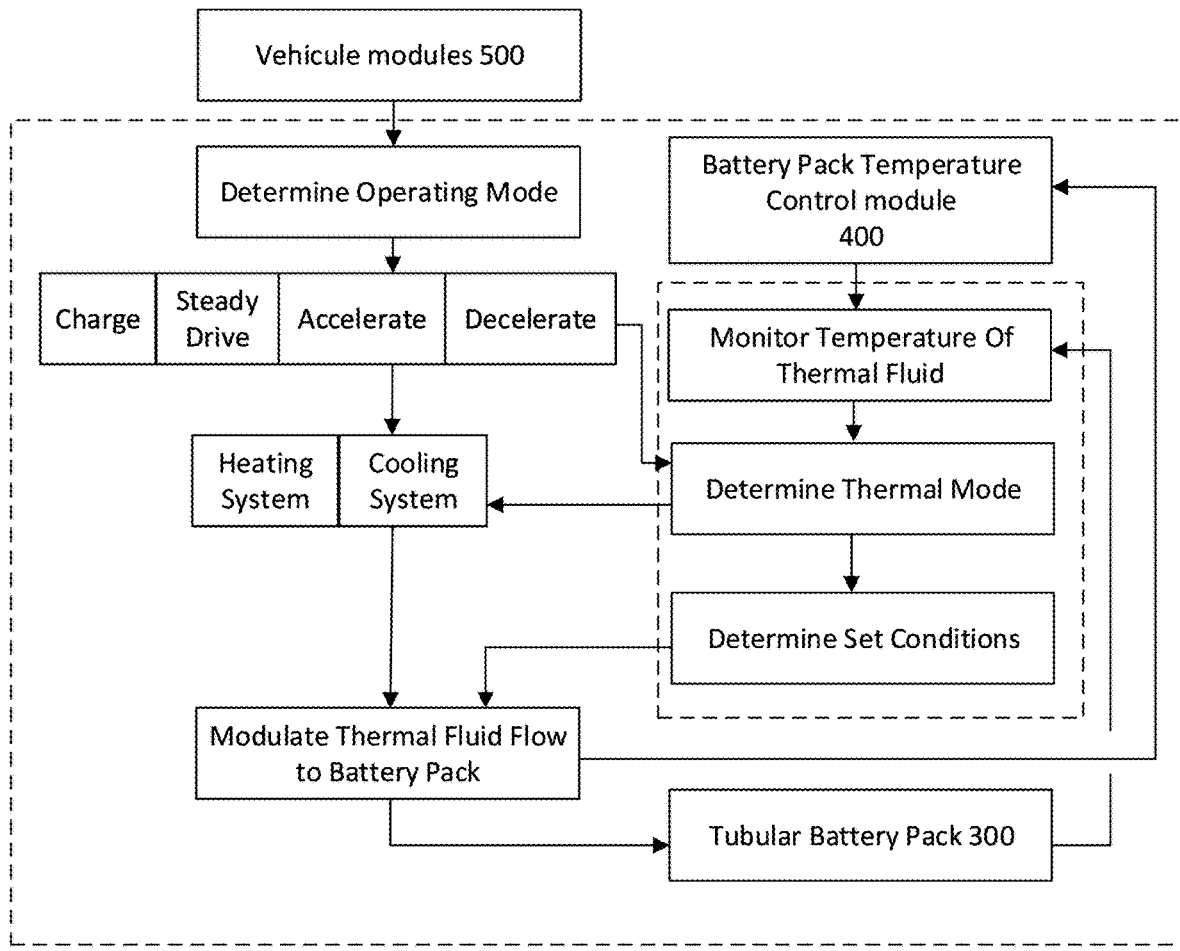

FIG. 6 provides a logic tree for the function of the battery temperature control module 400 in relation to the vehicle modules 500. The outlet temperature of the battery is monitored by the temperature control module 400 which determine the set conditions and thermal mode of either heating or cooling based on the operating mode of the vehicle from the vehicle modules 500. The thermal fluid circulation flow rate is set in accordance with an embodiment of this invention.

DETAILED DESCRIPTION OF THE INVENTION

The present invention is focused on the making of tubular battery pack and integral tubular battery for electric vehicles and machinery characterised by the use of high energy density lithium-ion cells mounted in thin tubes in efficient tube and shell heat exchanger configuration for thermal management. The tubular battery has a safety relief system for the venting of potential harmful gases that may be released. The tubular battery is easy to maintain, refurbish and recycle. Each tube holds one lithium-ion cell mounted inside the tube and electrically insulated from the tube wall using external thin washers or internal insulating plate. The remainder of the cell surface is exposed and transfer heat by both convection and radiation to the inner wall of the tube. A cooling or heating medium is circulated in and out of the shell and over the outer surface of the tubes to maintain them at an optimum temperature range of 0 to 50° C. The tube bundle has an integral battery management system and a safety relief system. Each tube and shell assembly, is considered one module within the battery pack. Multiple modules are connected together either in series or in parallel to increase the voltage or the current of the battery as required by the electric vehicle or machine.

The embodiments of the invention in which an exclusive propriety or privilege is claimed are presented below:

1. A tubular battery pack made out of plurality of thin tubes made out of highly conductive material and known for excellent resistance to corrosion such as but not limited to stainless steel 316 or 304. The tubes have standard nominal size of 1 to 2 inches tube diameter and cut to proper length of a single or multiple of a lithium-ion cell of 65 mm to 70 mm plus tolerance.

2. The prepared tubes of embodiment 1 are inserted into two tube-sheets that are in turn attached to a rectangular or cylindrical shell to form a fixed leak tight tube and shell heat exchanger configuration for lithium-ion cells packing and for battery thermal management. Such assembly is unique and referred to as tubular battery pack. The tube-sheets form the flanges to the shell from both sides for further attachment of other components, such as a safety relief system and the electrodes of the battery.

Figure 3A:
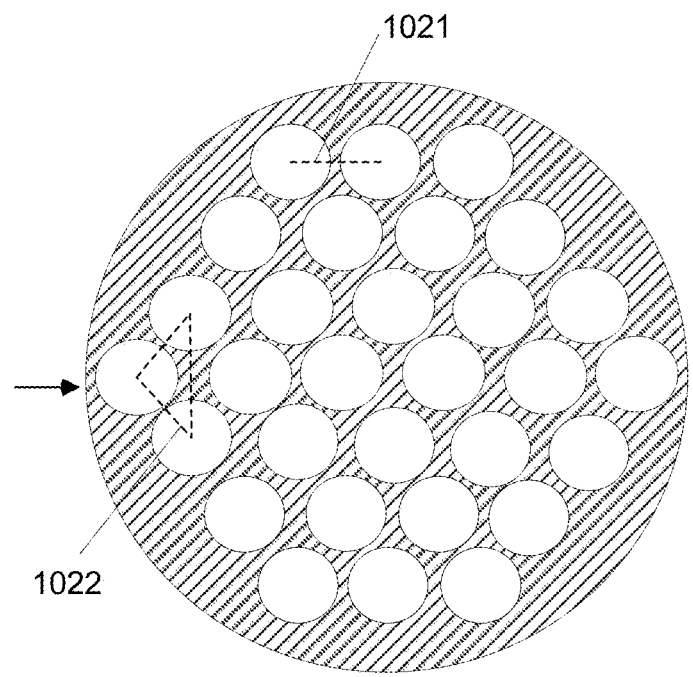
Figure 3B:
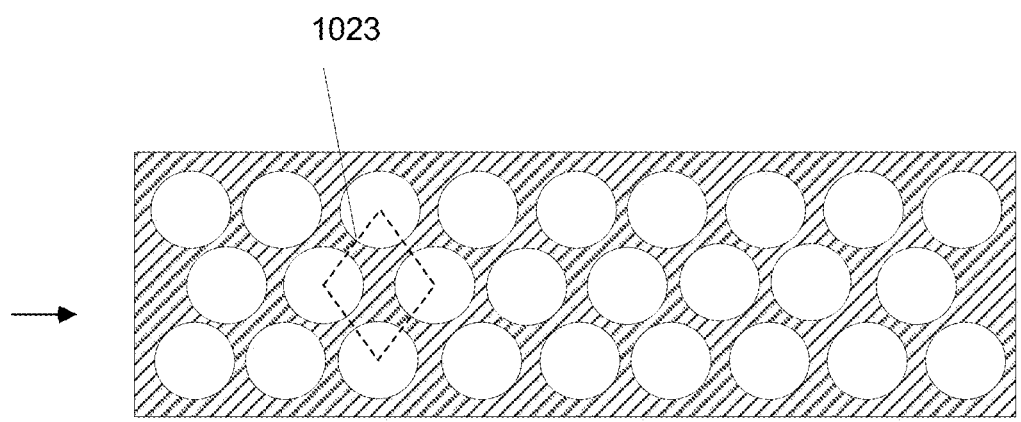
Figure 4A:
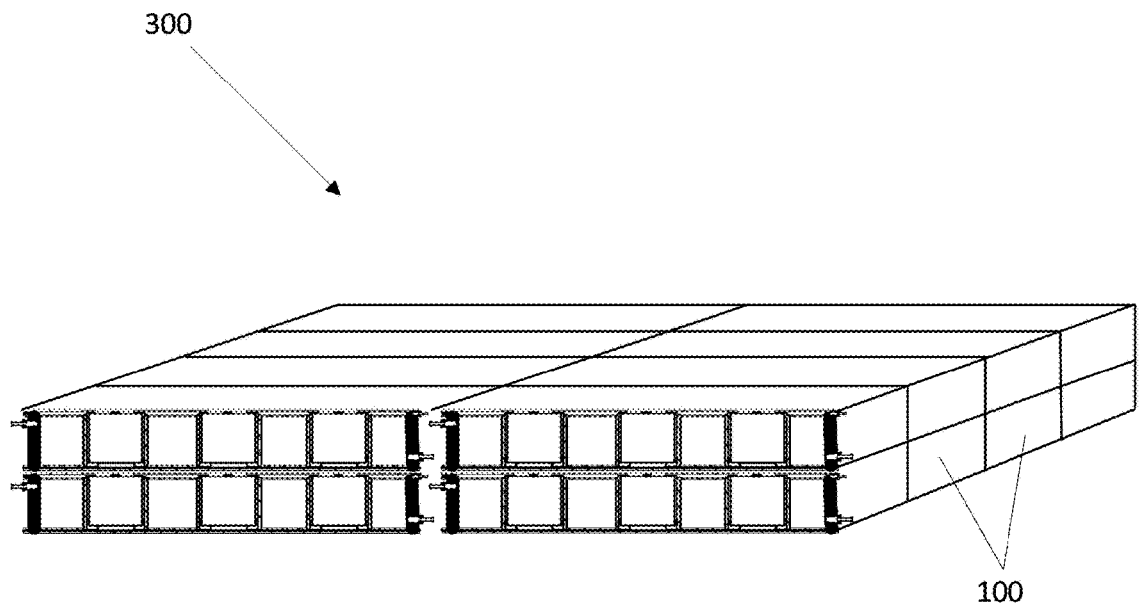
FIG. 4A shows multiple modules 100 assembled into a battery pack 300. The lithium-ion cell orientation is vertical in accordance with an embodiment of this invention.
Figure 4B:
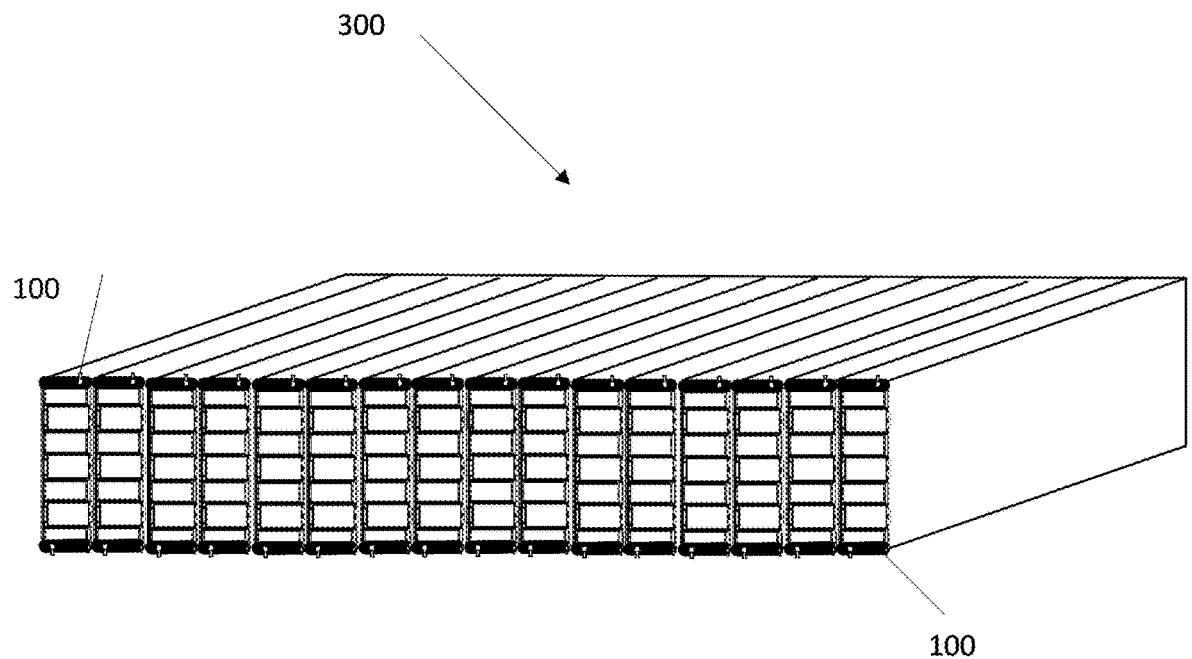
FIG. 4B shows multiple modules 100 assembled into a battery pack 300. The lithium-ion cell orientation is horizontal in accordance with an embodiment of this invention.

The tubes are expanded and fixed to the tube-sheets from both ends using a technique called tube rolling. The tubes are arranged in a triangular or rotated square pitch as shown by FIG. 3A and FIG. 3B.

3. Electrically insulating washers are mounted to lithium-ion batteries which in turn are placed in the tubes of the tubular battery assembly of embodiment 2. The cells are electrically insulated from the tubes while the external surface of the battery cells is still exposed and can still transfer heat to the tubes by both radiation and convection.

4. Lithium-ion cells are made as an integral part of the tubes so that the tubular battery assembly of embodiment 2 constitute an integral tubular battery. The electrodes of said battery are insulated from the tube wall and tube-sheet and only heat is exchanged through the tube wall to the thermal fluid circulating in and out of the shell. The main difference in this embodiment is that the tube and shell configuration of embodiment 2 is made to an integral battery in place of a battery pack for removable lithium-ion cells.

Figure 2:
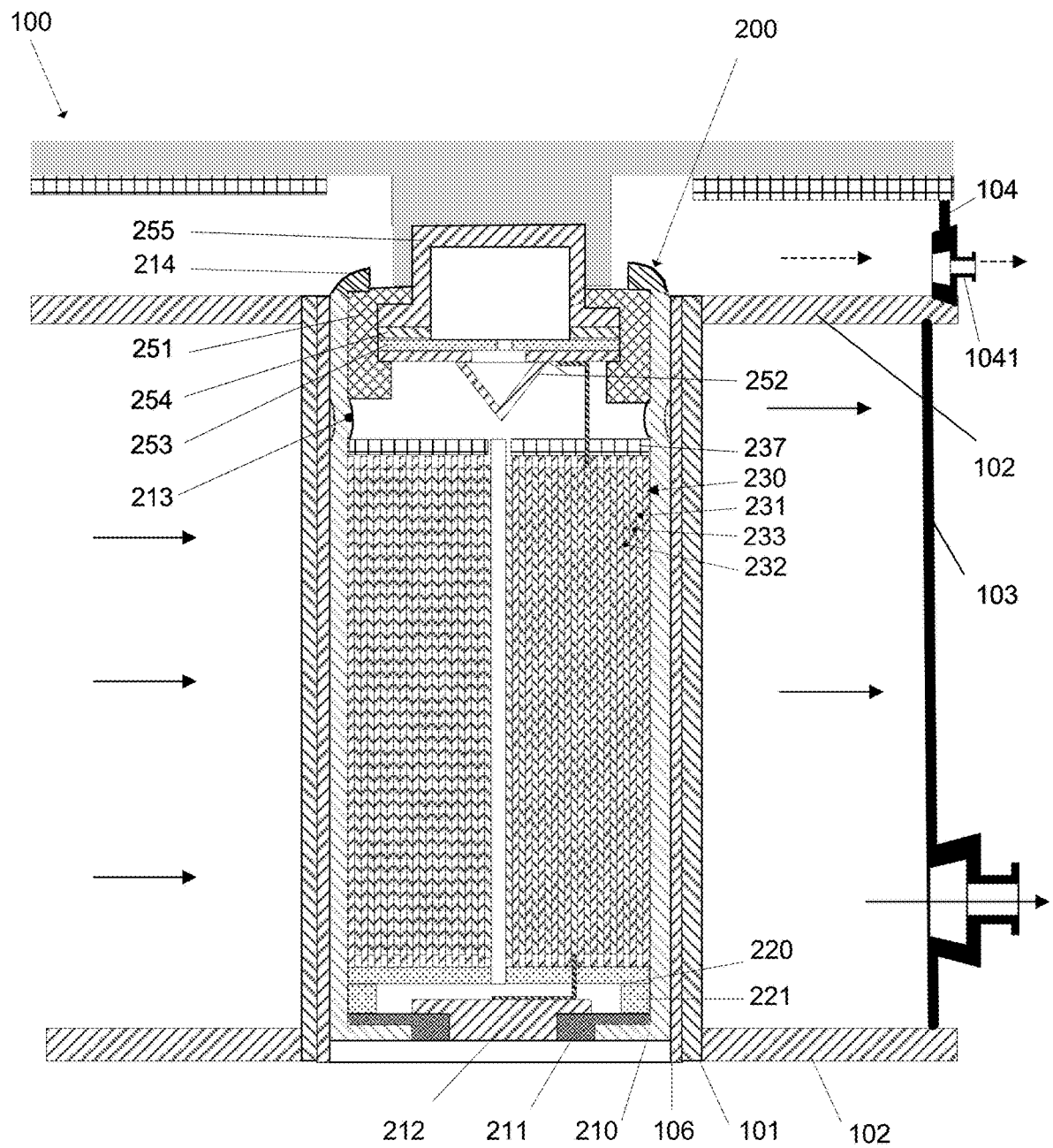

FIG. 2 illustrates a close-up of integral tubular battery 100 and a cross section showing how one lithium-ion cell is integral to the tube and shell configuration. The tubes 101, are attached from both ends to two fixed tube-sheets 102, and in turn to the shell 103. The cell 200 is a typical cylinder lithium-ion cell with rolled electrode assembly 230 such as in the 18650 type. The main improvement is that the bottom plate 212 is attached to the cell's anode and insulated from the cylindrical wall 210 using internal insulating plate 211. Also, an insulating O-ring 221 is added under the insulating plate 220 and assure that the cell remains leak tight. This modification insulates the lithium-ion cell cylindrical wall 210 and allows for direct contact with the metal fitting 106 and tube wall 101 for the conduction of heat but not electricity in accordance with an embodiment of this invention. The cylindrical wall 210 has an indented part 213 and inward bent 214 to hold the cap assembly 250 in place. A second insulating plate is 237 is disposed on top of the electrode assembly 230. A safety vent 252 will deform and rupture when the internal pressure of the cell reaches 2.8 MPa (406 psig).

Gasket 251 is kept as part of the original design where it was used to insulate the cathode 255 from the cylindrical wall. When vent 252 is deformed, circuit module 253 is damaged and interrupts current flow. A positive temperature coefficient device (PCT) 254 is able to interrupt current over-flow.

Figure 5:
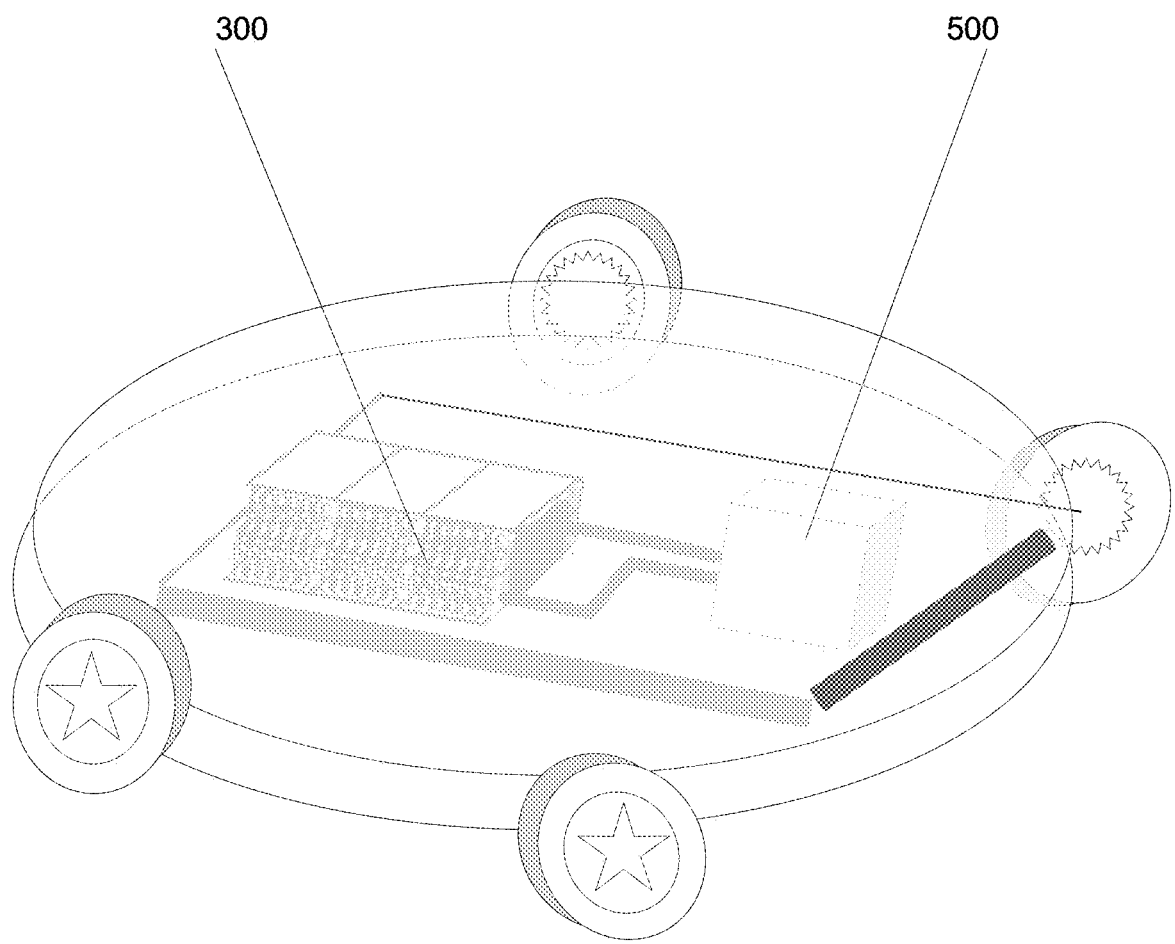
FIG. 5 shows tubular battery pack 300 mounted on the chassis of a vehicle in relation with other vehicle modules 500 and in accordance with an embodiment of this invention.

5. The shell of both tubular battery pack of Embodiment 2 and integral tubular battery of embodiment 4 has two nozzles for the inlet and outlet of thermal fluid. Thermal fluid is circulated to a conditioning system as traditionally used in heating and cooling systems. The inlet temperature of the thermal fluid is always constant as it is defined by the conditioning system output. The outlet temperature is variable and depends on the battery heat generation. This outlet temperature is monitored and controlled by the temperature control module 300 in FIG. 5 in the temperature range requirement of 0° C. to 50° C. Thermal fluid can be glycol base or other eco-friendly known fluid.

Figure 1:
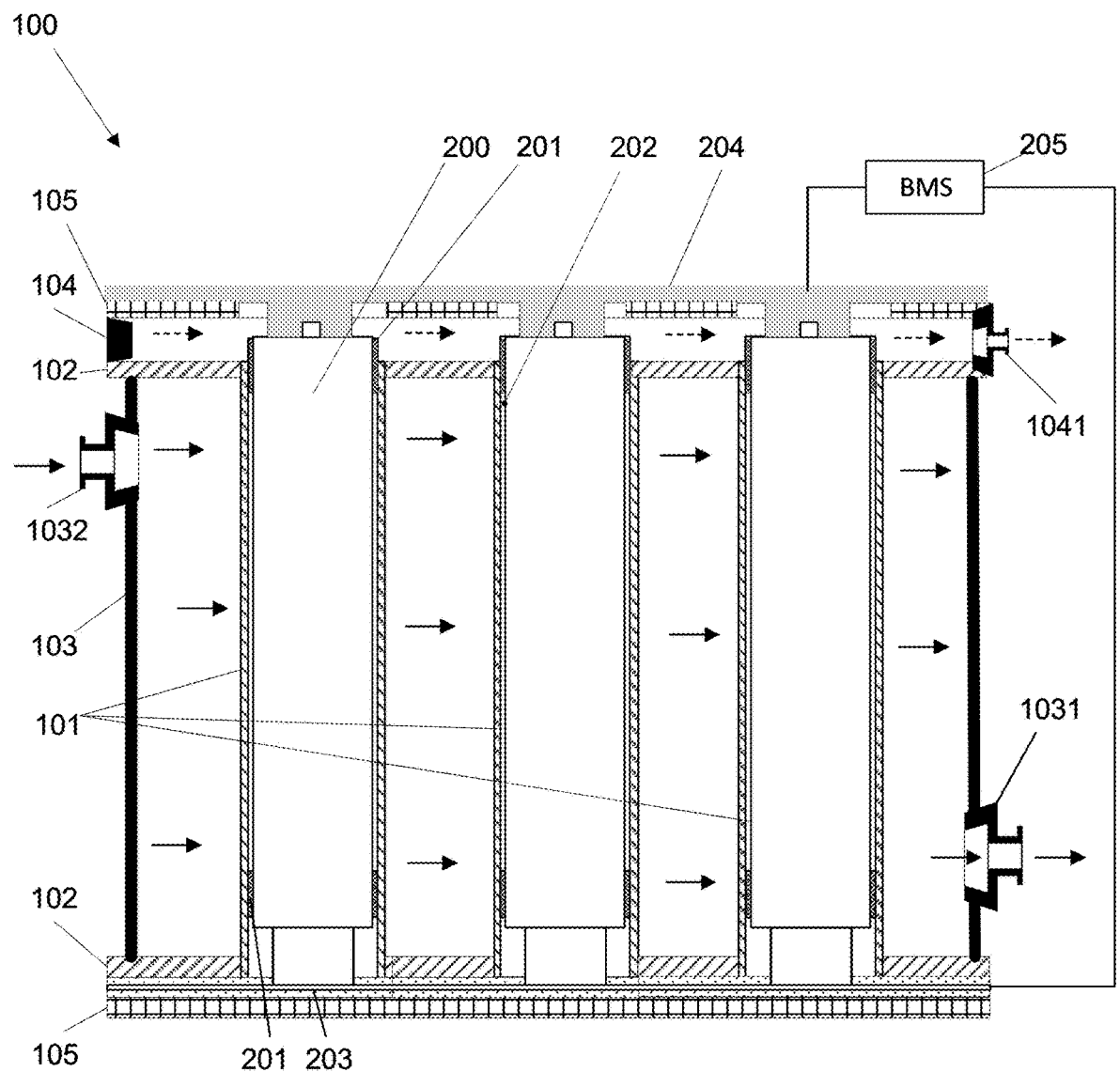

6. The said tubular battery of embodiment 2, and embodiment 4, is attached from one end through the tube-sheet to a closure 104 as identified in FIG. 1 and FIG. 2. The closure has a relief nozzle 1041 and connected to a safety relief system.

7. Two electrodes are attached to both ends of the tubular battery of embodiment 2 as well as embodiment 4 to form a module. The electrodes are attached to a battery management system (BMS) to control the charge and recharge of the battery as identified in FIG. 1.

8. Multiple tubular battery or modules of either embodiment 2 or embodiment 4 are assembled together to form a final electric vehicle battery that is intended to be installed on the chassis of the vehicle.

9. The size of each module, its tube-sheets and shell assembly, are dictated by the need of the electrical motor for maximum voltage, maximum current requirement and available space. In this embodiment, three examples are given. The first and second examples are for vertical vs. horizontal cell orientation, for a mid size car with 5 ft×4 ft available chassis area. The third example is for a larger chassis such as that of a school bus of 40 ft×8 ft.

First, in a 2 ft long×1¼ ft wide rectangular tube-sheet one can pack 240 1-inch diameter tubes for the packing of lithium-ion cells of the type 18650. One module height when the cells are placed vertically is about 3 inches and two modules will have 6 inches. With such configuration one can place 16 modules in a box of 5 ft by 4 ft by 6 inches. This gives a total of 3,840 lithium–ion cells battery packed in vertical cell orientation. The battery in this example has 37 kWh based on 2600 mA and 3.7V of one lithium-ion cell of 18650 type.

Second, when the cells are placed in horizontal configuration, a tube-sheet of 5 ft by 8 inches height can hold 288 1-inch diameter tubes for the packing of lithium-ion cells of the type 18650 and has a shell width of only 3 inches. When stacked together in horizontal direction, in a box of 5 ft by 4 ft by 8 inches, 16 modules and a total of 4608 cells make the final battery. The battery in this example has 44 kWh, based on 2600 mAh and 3.7V of one lithium-ion cell of 18650 type.

Third, when a school bus chassis area of 40 ft×8 ft is used with horizontal cell orientation, up to 700 kWh battery is achievable and capable of running a 200 hp motor for 4.5 hours.

What is claimed is:

1. A integral tubular battery, having a plurality of modules, where each module comprises one rechargeable tubular battery pack, and where each tubular battery pack is made out of a plurality of tubes, wherein the tubes are fixed from both ends into two tube-sheets, and wherein the said tube-sheets are attached to a rectangular or cylindrical shell to form a fixed and leak tight shell and tube heat exchanger configuration, wherein the tubes provide heating and cooling for lithium-ion cells mounted within the tubes, wherein the tubular battery pack stores from 45 kWh to 700 kWh within the lithium-ion cells.

2. The tubular battery of claim 1 wherein the shell of tubular battery pack has two nozzles for the circulation of thermal fluid for heating and cooling of the tubes therein.

3. The tubular battery of claim 1 wherein the tubular battery pack is equipped with a control system that monitors the outlet temperature of the thermal fluids and regulates the thermal fluid flow.

4. The tubular battery of claim 1, wherein the tubes are 1 inch or 2 inches nominal diameter to hold 18 mm and 46 mm lithium-ion cells or other size rechargeable cells, and wherein the tubes have triangular or rotated square pitch configuration and where the pitch is equal to the tube diameter plus ¼ of inch for maximum number of tubes per tube-sheet and optimum heat transfer.

5. The tubular battery of claim 1, wherein the lithium-ion cells are independently made unit cells and are mounted to thin washers for electric insulation and fitted inside the tubes.

6. The tubular battery of claim 1 wherein the tubular battery pack has an integral safety relief system that consists of a closure attached to a tube-sheet and equipped with a relief nozzle.

7. The tubular battery of claim 1 wherein the tubular battery pack is equipped with two electrodes that are connected to a battery management system (BMS).

8. A integral tubular battery, having a plurality of modules, where each module comprises one rechargeable tubular battery pack, and where each tubular battery pack is made out of a plurality of tubes, wherein the tubes are fixed from both ends into two tube-sheets, and wherein the said tube-sheets are in turn attached to a rectangular or cylindrical shell to form a fixed and leak tight shell and tube heat exchanger configuration, wherein the tubes are the battery cells for electric storage and discharge and the shell provides for heating and cooling of the tubes.

9. The integral tubular battery of claim 8 wherein the shell of tubular battery pack has two nozzles for circulation of thermal fluid for heating and cooling of the tubes therein.

10. The integral tubular battery of claim 8 wherein the shell of tubular battery pack is equipped with a control system that monitors the outlet temperature of the thermal fluids and regulates the thermal fluid flow.

11. The integral tubular battery of claim 8, wherein the tubes have triangular or rotated square pitch configuration where the pitch is equal to the tube diameter plus ¼ of inch for maximum number of tubes per tube-sheet and optimum heat transfer.

12. The tubular battery of claim 8, wherein lithium-ion cells are made integral to the tube and shell assembly, and wherein the anode of the said cells is attached to an internal conductive plate at the bottom end of the cylinder and wherein the said plate is insulated from the cylinder using another internal insulating plate, and wherein the said cylinder wall can be directly mounted to a metal fitting and in direct contact with the tube wall for exchange of heat but not electricity.

13. The integral tubular battery of claim 8 wherein the tubular battery pack has a safety relief system that consists of a closure attached to a tube-sheet and equipped with a relief nozzle.

14. The integral tubular battery of claim 8 wherein the tubular battery pack is equipped with two electrodes that are connected to a battery management system (BMS).

* * * * *